United States Patent
Madar et al.

(10) Patent No.: US 9,561,916 B2
(45) Date of Patent: Feb. 7, 2017

(54) STORAGE TRAY FOR AUTOMATICALLY LOADING AND UNLOADING STACKS OF FLAT ARTICLES ON EDGE, AND A LOADING AND UNLOADING METHOD

(71) Applicant: SOLYSTIC, Gentilly (FR)

(72) Inventors: Francois Madar, Bourg les Valence (FR); Bruno Cartal, Montelier (FR)

(73) Assignee: SOLYSTIC, Gentilly (FR)

( * ) Notice: Subject to any disclaimer, the term of this patent is extended or adjusted under 35 U.S.C. 154(b) by 865 days.

(21) Appl. No.: 13/813,565

(22) PCT Filed: Oct. 30, 2012

(86) PCT No.: PCT/FR2012/052516
§ 371 (c)(1),
(2) Date: May 3, 2013

(87) PCT Pub. No.: WO2013/093254
PCT Pub. Date: Jun. 27, 2013

(65) Prior Publication Data
US 2014/0126982 A1 May 8, 2014

(30) Foreign Application Priority Data
Dec. 22, 2011 (FR) ..................................... 11 62317

(51) Int. Cl.
*B65B 21/02* (2006.01)
*B65G 65/00* (2006.01)
(Continued)

(52) U.S. Cl.
CPC ............... *B65G 65/00* (2013.01); *B07C 3/008* (2013.01); *B65H 31/3081* (2013.01);
(Continued)

(58) Field of Classification Search
USPC ................. 414/416.01, 416.03; 206/710, 711
See application file for complete search history.

(56) References Cited

U.S. PATENT DOCUMENTS 4,776,742 A   10/1988  Felder
5,320,244 A * 6/1994  Yu ..................... G11B 33/0433
                                                    206/308.1
(Continued)

FOREIGN PATENT DOCUMENTS

CN   1214641 A1   4/1999
CN   1291120 A    4/2001
(Continued)

OTHER PUBLICATIONS

Communication dated Aug. 27, 2015, issued by the Chinese Intellectual Property Office in counterpart Chinese Application No. 201280058999.4.
(Continued)

*Primary Examiner* — Saul Rodriguez
*Assistant Examiner* — Willie Berry, Jr.
(74) *Attorney, Agent, or Firm* — Sughrue Mion, PLLC

(57) ABSTRACT

Storage tray for automatically unloading stacks of flat articles stacked on edge, the storage tray having panels and a bottom plate provided with slots through which moving fingers can pass for moving the edges of the flat articles away from or towards the bottom plate and for automatically unloading the flat articles from the storage tray, and for automatically loading the flat articles into the storage tray, the panels defining bearing faces suitable for receiving the flanks of the stacks of flat articles and provided with grooves in register with the ends of the slots so that the moving fingers extend beyond the stack of flat articles into the grooves so as to ensure that all of the flat articles are moved. Also a method of loading and of unloading the storage tray.

11 Claims, 2 Drawing Sheets

(51) Int. Cl.
*B07C 3/00* (2006.01)
*B65H 31/30* (2006.01)

(52) U.S. Cl.
CPC ............ *B65H 2301/422542* (2013.01); *B65H 2301/422548* (2013.01); *B65H 2701/1916* (2013.01)

(56) References Cited

U.S. PATENT DOCUMENTS

| | | | |
|---|---|---|---|
| 8,060,252 B2 * | 11/2011 | Gage | H01L 21/67196 118/715 |
| 2004/0222126 A1 * | 11/2004 | Chen | H05K 13/0069 206/710 |

FOREIGN PATENT DOCUMENTS

| | | |
|---|---|---|
| CN | 1625512 A | 6/2005 |
| DE | 2 304 331 A1 | 8/1974 |
| DE | 10 2006 031 121 B3 | 11/2007 |
| EP | 0 077 554 A1 | 4/1983 |
| FR | 2 646 620 A1 | 11/1990 |

OTHER PUBLICATIONS

French Search Report for Corresponding FR 1162317, Aug. 6, 2012.

\* cited by examiner

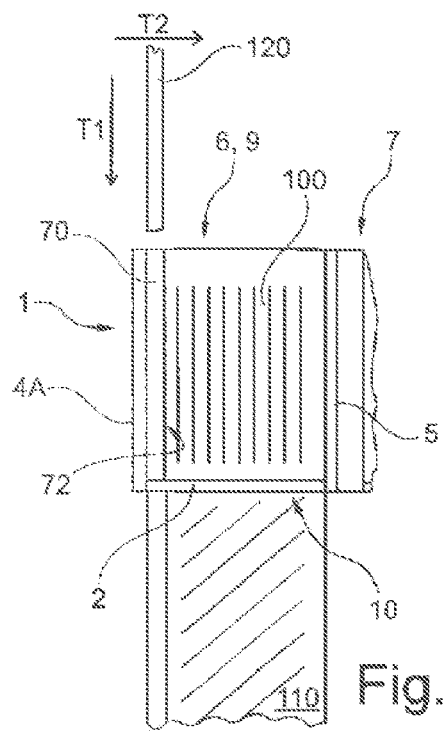
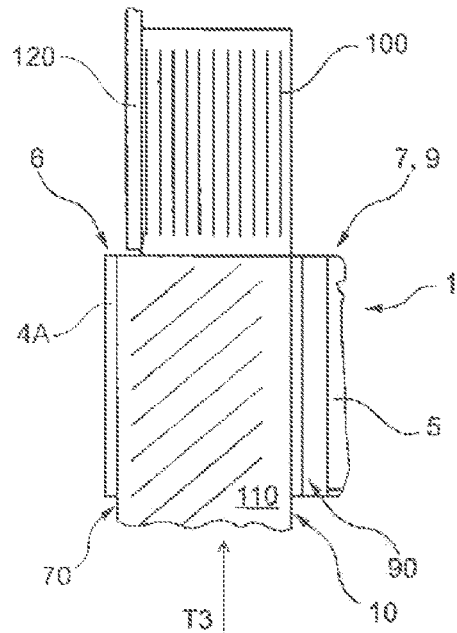
Fig. 2  Fig. 3
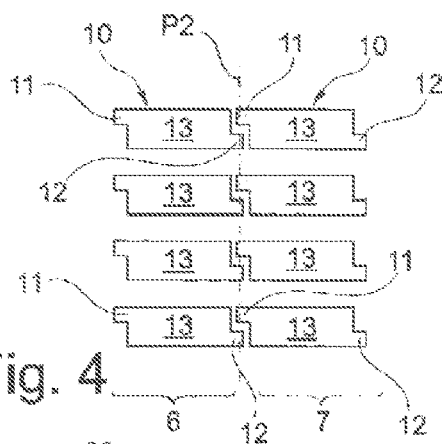
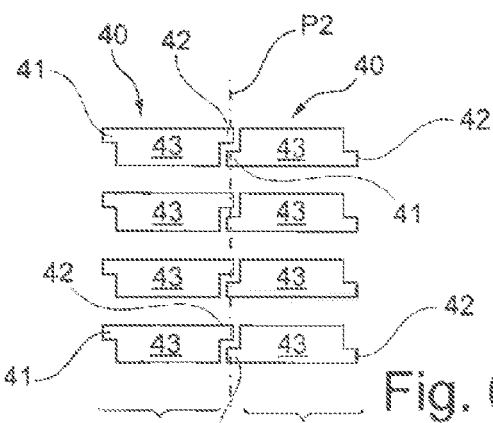
Fig. 4  Fig. 6
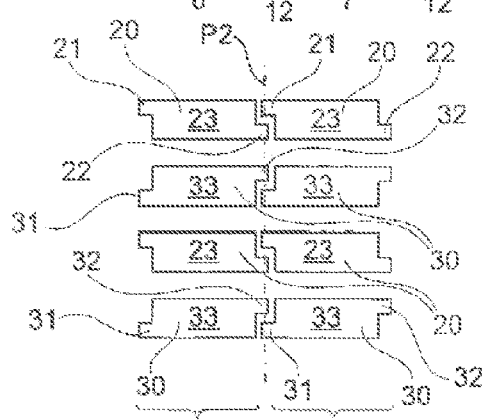
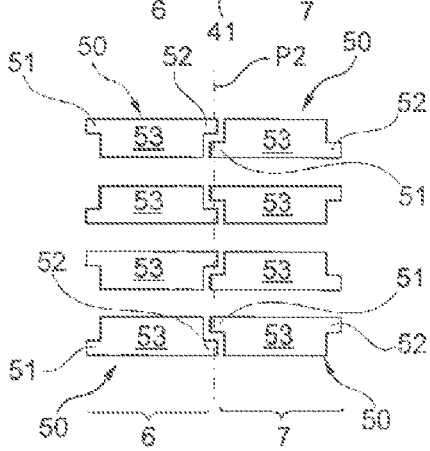
Fig. 5  Fig. 7

STORAGE TRAY FOR AUTOMATICALLY LOADING AND UNLOADING STACKS OF FLAT ARTICLES ON EDGE, AND A LOADING AND UNLOADING METHOD

CROSS REFERENCE TO RELATED APPLICATIONS

This application is a National Stage of International Application No. PCT/FR2012/052516 filed Oct. 30, 2012, claiming priority based on French Patent Application No. 11 62317 filed Dec. 22, 2011, the contents of all of which are incorporated herein by reference in their entirety.

TECHNICAL FIELD

The invention relates to a storage tray for automatically loading and unloading stacks of flat articles stacked on edge, the storage tray having a bottom plate and panels defining at least one compartment provided with an opening that is provided opposite from the bottom plate, the compartment being designed to receive at least one stack of flat articles, provision being made for the edges of the flat articles to rest on the bottom plate and for at least one flank of the stack to bear against a bearing surface formed by the inside face of one of the panels.

In the meaning of the invention, a "flat article" means, particularly but not exclusively, a mailpiece. Mailpieces that are suitable for being stored, loaded and unloaded by means of the storage tray of the invention may be of various sizes, and they may also have a variety of mechanical characteristics, in particular as regards stiffness. Such a mailpiece may, inter alia, be an ordinary letter, a magazine, an envelope with or without a window, a newspaper, or indeed a catalog wrapped in plastic or in paper, with or without gussets.

The invention also relates to a method of unloading at least one stack of flat articles on edge from a storage tray having a bottom plate that receives the edges of the flat articles and having at least one inside bearing surface that receives a flank of the stack, the bottom plate being provided with at least one through slot through which at least one moving finger is caused to slide between a retracted position in which the free end of the moving finger does not pass through the slot and an active position in which the moving finger passes through the slot to the opening in the storage tray so that the edges of the flat articles of the stack rest on the free end and can be moved away from the bottom plate for the purpose of unloading the stack from the storage tray.

The invention finally relates to a method of loading at least one stack of flat articles on edge into a storage tray having a bottom plate designed to receive the edges of the flat articles so that they bear against it and having at least one inside bearing surface designed to receive a flank of the stack, the bottom plate being provided with at least one through slot through which at least one moving finger is caused to slide between an active position in which the moving finger passes through the slot to the opening in the storage tray so that the edges of the flat articles of the stack can be placed on the free end of the moving finger and a retracted position in which the free end of the moving finger no longer passes through the slot so that the edges of the flat articles loaded in the storage tray rest on the bottom plate.

PRIOR ART

This type of storage tray is in common use, in particular for storing stacked flat articles, such as mailpieces, to be sorted by a sorting machine. In known manner, during the process of sorting the flat articles, first trays containing flat articles are brought to a sorting machine at which the first storage trays are unloaded manually or automatically (if the mailpieces are stored flat). The flat articles are then unstacked and then sorted in compliance with a determined sorting plan, before being distributed among sorting outlets at which they are stacked. The stacks of flat articles can then be loaded manually into second storage trays. In particular when the mailpieces are stacked on edge, the storage tray loading and unloading operations need to be performed manually, thereby making the sorting process more complex, making it less reliable, and limiting its efficiency. In addition, using storage trays that are different from one another requires a large stock of storing storage trays, complicated storage tray management and a complicated storage tray circuit.

Document FR 2 646 620 describes a storage tray and an unloading method making it possible to automate the unloading in part. To that end, the bottom of the storage tray is provided with slots allowing moving fingers to pass through for extracting a stack of mail from the storage tray. In order to be unloaded, the storage tray is pressed from below against the underside of an unloading surface, and an arm that is pivotally mounted on a horizontally moving frame is then inserted into the storage tray in front of the stack of flat articles. The arm is then moved inside the storage tray until it comes into contact with the separator defining the stack of flat articles. Before loading the storage tray, an arm is used to move the stack away from a strip against which the flat articles are bearing.

The following documents describe other storage trays, and storage tray unloading and loading methods: DE 10 2006 031 121, DE 2 304 331, and EP 0 077 554.

SUMMARY OF THE INVENTION

An object of the invention is to propose an alternative storage tray, a loading method, and an unloading method that allow stacks of flat articles on edge to be loaded and unloaded while using the same type of storage tray both for loading and for unloading, which storage tray makes it possible to guarantee that all of the flat articles in the same stack are loaded or unloaded at the same time in reliable manner.

To this end, the invention provides a storage tray for automatically loading and unloading stacks of flat articles stacked on edge, the storage tray having a bottom plate and panels defining at least one compartment provided with an opening that is provided opposite from the bottom plate, the compartment being designed to receive at least one stack of flat articles, provision being made for the edges of the flat articles to rest on the bottom plate and for at least one flank of the stack to bear against a bearing surface formed by the inside face of one of the panels, said storage tray being characterized in that the bearing surface is provided with at least two grooves disposed facing each other and having their end walls set back, the grooves extending longitudinally from the bottom plate to the opening and each of them being suitable for longitudinally receiving a tooth of a comb that is inserted into it without coming into contact with the flat articles, and that, once inserted, is designed to move the flank of the stack laterally away from the bearing surface, in that the bottom plate is provided with at least one through slot, at least one end of which is disposed in direct alignment with the groove, the slot being substantially of a shape chosen from T-shaped, and Z-shaped, the ends of each slot having a profile that is substantially identical to the profile of the respective corresponding groove, the slot and the groove being suitable for allowing at least one moving finger to pass through that is mounted to slide between a retracted position in which the free end of the moving finger does not pass through the slot and an active position in which the moving finger passes through the slot and is engaged in the groove so that the edges of all of the flat articles of the stack rest on the free end and can be moved away from or towards the bottom plate for the purpose of automatically unloading the flat articles from the storage tray or of automatically loading the articles into the storage tray, without the flank of the stack coming into contact with the bearing surface.

The basic idea of the invention is to provide a storage tray provided with at least one slot having at least one end disposed in direct alignment with a groove allowing a moving finger to pass through, to be moved automatically, and to be guided so that the free end of the moving finger pushes or retains the edges of the flat articles for the purpose respectively of extracting them from the storage tray or of inserting them into said storage tray. Since the groove is provided beyond the bearing surface of the flat articles defining the stack, the groove makes it possible to ensure that the entire stack of flat articles is accompanied by the moving finger during loading and/or unloading. Thus, there is no risk of any flat article remaining wedged between the moving finger and the corresponding bearing surface. In addition, the moving finger being guided in the groove also makes it possible to guarantee reliable loading and reliable unloading. The storage tray can thus be loaded and unloaded automatically and reliably with flat articles stacked on edge.

The storage tray of the invention may advantageously have the following features:
  the panels comprise at least two outer panels that are substantially mutually parallel, the "at least one groove" comprises first grooves provided in the inside faces of the outer panels, the outside face of each of the outer panels is provided with at least one additional groove extending substantially parallel to the corresponding first groove relative to which it is offset transversely, the additional groove being suitable for longitudinally receiving at least one settling element designed to position the slot relative to the moving finger;
  the storage tray is provided with a plurality of first grooves and of additional grooves disposed in alternation with one another;
  in the first midplane of each outer panel, the first grooves and the additional grooves are in part superposed relative to one another so that the first midplane simultaneously intersects the first grooves and the additional grooves;
  the "at least one compartment" comprises at least a first compartment and a second compartment that are mutually adjacent and that are defined by at least one panel defining a partition subdividing the storage tray, the "at least one groove" further comprises at least one second groove and at least one third groove that are provided in the opposite inside walls of the partition, and the "at least one slot" comprises first slots provided in the first compartment and second slots provided in the second compartment;
  the storage tray may be provided with a plurality of second grooves and of third grooves disposed in alternation with one another;
  in the second midplane of the partition, the second grooves and the third grooves are in part superposed relative to one another so that the second midplane simultaneously intersects the second grooves and the third grooves;
  at least some of the first slots are disposed in register with at least some of the second slots, the partition being arranged so that the second branches of the first slots are superposed on the first branches of the second slots; and
  the first and second slots are disposed in at least one of the following configurations that can be combined:
    the first and second slots point in identical directions;
    the first and second slots point in opposite directions respectively in the first compartment and in the second compartment;
    the first slots point in mutually opposite directions in alternation in the first compartment, and the second slots point in mutually opposite directions in alternation in the second compartment.

The invention also provides a method of unloading at least one stack of flat articles on edge from a storage tray having a bottom plate that receives the edges of the flat articles and having at least one inside bearing surface that receives a flank of the stack, the bottom plate being provided with at least one through slot through which at least one moving finger is caused to slide between a retracted position in which the free end of the moving finger does not pass through the slot and an active position in which the moving finger passes through the slot to the opening of the storage tray so that the edges of the flat articles of the stack rest on the free end and can be moved away from the bottom plate for the purpose of unloading the stack from the storage tray, said method being characterized in that at least one storage tray is used that is provided with at least one groove provided in the bearing surface and extending longitudinally from the bottom plate to the opening, in that, before the moving finger is caused to slide, and in a first stage, at least one tooth is inserted into the groove so that the tooth is not in contact with the flank of the stack contained in the storage tray and so that, in a second stage, the arm is shifted so as to move the flank away from the bearing surface, and in that, while the moving finger is sliding from its retracted position to its active position, the tooth is moved simultaneously.

The invention finally provides a method of loading at least one stack of flat articles on edge into a storage tray having a bottom plate designed to receive the edges of the flat articles so that they bear against it, and having at least one inside bearing surface designed to receive a flank of the stack, the bottom plate being provided with at least one through slot through which at least one moving finger is caused to slide between an active position in which the moving finger passes through the slot to the opening of the storage tray so that the edges of the flat articles of the stack can be placed on the free end of the moving finger and a retracted position in which the free end of the moving finger no longer passes through the slot so that the edges of the flat articles loaded in the storage tray rest on the bottom plate, said method being characterized in that at least one storage tray is used that is provided with at least one groove provided in the bearing surface and extending longitudinally from the bottom plate to the opening, in that, before the moving finger is caused to slide, the flank is shifted away from the bearing surface by means of at least one tooth, in that, while the moving finger is sliding, the tooth is inserted into the groove so that the flank of the stack is not in contact with the bearing surface, and in that, while the moving finger is sliding from its active position to retracted position, the tooth is moved simultaneously.

Herein, the terms "first", "second", "third" and the like are used merely by way of non-limiting indication.

BRIEF DESCRIPTION OF THE DRAWINGS

The present invention can be better understood and other advantages appear on reading the following detailed description of embodiments given by way of non-limiting example and with reference to the accompanying drawings, in which:

FIGS. 2 and 3 are diagrammatic section views on the section AA of FIG. 1 of a storage tray of the invention, containing a stack of flat articles, with the moving finger being respectively in the retracted position and in the active position; and FIGS. 4 to 7 are diagrammatic views of various configurations of slots in a storage tray of the invention.

Figure 1:
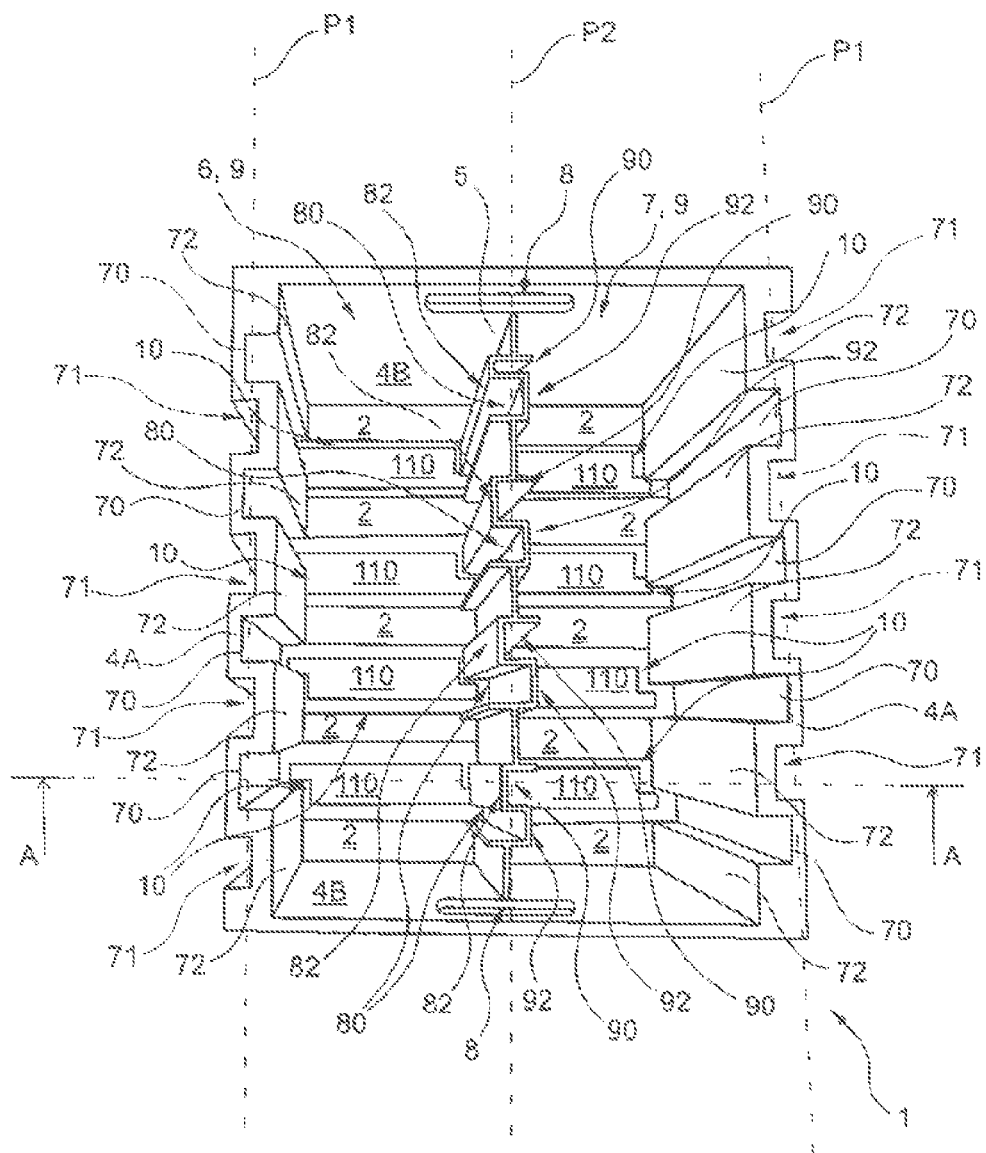
FIG. 1 is a perspective view from above of a storage tray of the invention, as empty, with the moving fingers being in the retracted position.

In these figures, the flat articles in a stack are represented diagrammatically by a rectangular outline containing vertical lines that stop short of the outline.

DESCRIPTION OF THE EMBODIMENTS

With reference to the figures, a storage tray 1 of the invention has, in conventional manner, a bottom plate 2, outer panels 4A, 4B that are substantially parallel in pairs, and a partition 5 that is substantially parallel to two of the outer panels 4A and that, together with the bottom plate 2, defines first and second compartments 6, 7 that are adjacent to each other. The storage tray 1 has an opening 9 opposite from the bottom plate 2 and via which stacks of flat articles 100 can be loaded into the first and second compartments 6, 7 and unloaded therefrom. In the example shown, the first and second compartments 6, 7 are of substantially the same dimensions, but they may also be of different dimensions.

Each of the inside faces of the outer panels 4A that are substantially parallel to the partition 5, is provided with first grooves 70 that are substantially mutually parallel and that extend longitudinally from the bottom plate 2 to the opening 9. Each of the inside faces of these outer panels 4A thus has a first bearing surface 72 suitable for receiving the flank of the stack of flat articles contained in the storage tray 1 so that said flank bears against it, this first bearing surface 72 being interrupted by the first grooves 70. As described below, these first grooves 70 are suitable for longitudinally receiving the teeth of a comb that are dimensioned to be suitable for being inserted into the first grooves 70 without coming into contact with the flank of the flat articles that defines the stack of flat articles and that bears against the first bearing surface 72. Thus, when a stack of flat articles 100 is stored one or both of the first and second compartments 6, 7 of the storage tray 1, the edges of the flat articles 100 rest on the bottom plate 2 and one of the opposite flanks of the stack of flat articles 100 bears against a corresponding first bearing surface 72, without coming into contact with the end-walls of the first grooves 70.

Each of the outside faces of the outer panels 4A that are substantially parallel to the partition 5 is provided with additional grooves 71 that are substantially parallel to one another and to the first grooves 70. The additional grooves 71 are offset transversely relative to the first grooves 70, with which they are disposed in alternation. The additional grooves 71 extend over the entire height of the storage tray 1. These additional grooves 71 are suitable for longitudinally receiving settling elements (not shown) designed to position the sorting tray 1 while it is being loaded and/or unloaded. For example, these settling elements are tongues interposed between the moving fingers to which they are not secured.

In the example shown, the outer panels 4A are formed by thin plates shaped to define the first grooves 70 and the additional grooves 71. In the first midplane P1 of each outer panel 4A, the first grooves 70 and the additional grooves 71 are superposed in part relative to one another. Thus, the first midplane P1 of each outer panel 4A intersects the first grooves 70 and the additional grooves 71 simultaneously.

The two opposite inside faces of the partition 5 are provided respectively with second grooves 80 and with third grooves 90 that are substantially parallel to one another and to the first grooves 70. The second and third grooves 80, 90 extend longitudinally from the bottom plate 2 to the opening 9. The inside faces of the partition 5 thus respectively have second and third bearing surfaces 82, 92, each of which is suitable for receiving a flank of the stack of flat articles 100, which flank bears against it. The second and third bearing surfaces 82, 92 are interrupted by the second grooves 80 and by the third grooves 90. In the example shown, the partition 5 is formed by a thin plate shaped to define the second and third grooves 80, 90. In the second midplane P2 of the partition 5, the second and third grooves 80, 90 are superposed in part relative to one another. Thus, the second midplane P2 of the partition 5 intersects the second and third grooves 80, 90 simultaneously. The partition 5 is formed of first portions, each of which is substantially S-shaped, the first portions being interconnected by rectilinear second portions. The bends of each S-shape simultaneously form a second groove 80 for the first compartment 6 and a third groove 90 for the second compartment 7.

In the first and second compartments 6, 7, the bottom plate 2 is provided with through slots 10 that do not join together at the partition 5 and that have their ends extending directly in alignment respectively with the first grooves 70, with the second grooves 80, and with the third grooves 90. Thus, the slots extend respectively beyond the first, the second, and the third bearing surfaces 72, 82, 92. These slots 10 are designed to allow moving fingers 110 to pass individually through the bottom plate 2, which fingers are mounted to slide between a retracted position (shown in FIG. 2) in which the free ends of the moving fingers 110 do not pass through said slot 10 and an active position (shown in FIG. 3) in which the moving fingers 110 pass through the slot and are engaged in the first, second, and third grooves 70, 80, 90. While they are moving, from the bottom plate 2 to the opening 9, the moving fingers 110 are guided by the first, second, and third grooves 70, 80, 90. In the active position, the edges of the flat articles 100 of the stack contained in the storage tray 1 rest on the free ends of the corresponding moving fingers 110 and can be moved away from or towards the bottom plate 2 to load the flat articles 100 into the storage tray 1 or to unload said flat articles therefrom. The moving fingers 110 provided in register with the slots 10 are of shape complementary to the shape of the slots 10, and of slightly smaller dimensions so that they can slide therethrough. In order to unload each of the first and second compartments 6, 7, the moving fingers 110 are inserted from beneath the bottom plate 2 so as to engage respectively into the first compartment 6 and into the second compartment 7. It is possible to insert the moving fingers 110 successively or simultaneously into the first compartment 6 and into the second compartment 7. The same moving fingers 110 may also serve in turn for the first compartment 6 and then for the second compartment 7. When they are inserted into the first and/or second compartments 6, 7, the moving fingers 110 move the edges of the flat articles 100 away from the bottom plate 2 so that the flat articles 100 find themselves raised relative to the bottom plate 2 until they are extracted from the storage tray 1. Making provision for the moving fingers 110 to be guided by the first, second, and third grooves 70, 80, 90 prevents them from deviating from their paths, with the ensuing risk of the stack of flat articles 100 becoming unstable or of certain flat articles being wedged between moving fingers 110 and the outer panels 4A. In order to load the storage tray 1, and in reverse manner relative to the above-described procedure, the moving fingers 110 are previously inserted respectively into the first compartment 6 and into the second compartment 7. The flat articles 100 are then placed on edge on the free ends of the moving fingers 110 and the moving fingers 110 are then retracted, guided by the first, second, and third grooves 70, 80, 90, to their retracted position, by lowering them gradually into the storage tray 1 through the slots 10 so as to accompany the insertion of the flat articles 100 into their respective first or second compartments 6, 7. When the moving fingers 110 are fully retracted under the bottom plate 2, they are in their retracted position in which the edges of the flat articles 100 bear against the bottom plate 2. Advantageously, the main axis of each slot 10, namely along the length of the corresponding slot 10, intersects the partition 5. The slots 10 extend, for example, substantially perpendicularly to the partition 5 and to the facing outer panels 4A, and the flat articles 100 are disposed so that their edges are substantially parallel to the partition 5 and thus substantially perpendicular to the slots 10. The fact that the slots 10 extend beyond the first, second, and third bearing surfaces 72, 82, 92 makes it possible to ensure that all of the flat articles 100 rest on the free ends of the moving fingers 110. There is no risk of any flat article 100 remaining wedged between the moving fingers 110 and the corresponding first, second, and/or third bearing surfaces 72, 82, 92. All of the flat articles 100 can thus be extracted from the first and second compartments 6, 7 during unloading, and can be accompanied during loading.

In the example shown, the outer panels 4A, 4B and the partition 5 are formed by thin plates shaped to define the first, second, and third grooves 72, 82, 92. The partition 5 has first portions, each of which is substantially S-shaped, the first portions being interconnected by rectilinear second portions. The bends of each S-shape simultaneously form a second groove 80 for the first compartment 6 and a third groove 90 for the second compartment 7. Thus, in the second midplane P2 of the partition 5, the first and second grooves 80, 90 overlap. The free edge of each S-shape extends beyond the corresponding rectilinear second portion. This particular construction makes it possible to improve the guiding in translation of the moving fingers 110. In addition, the fact that the first grooves 70 and the additional grooves 71 are superposed in each first midplane P1 makes it possible to procure continuity in bearing between the ends of the moving fingers 110 and the settling elements. Thus, the edges of the flat articles 100 are continuously carried by the respective ends of the moving fingers 110 or by a settling element when the stack of flat articles 100 is slid laterally above the storage tray 1 for the purpose of being loaded or unloaded.

In the example shown in FIG. 4, each slot 10 is substantially Z-shaped, made up of: first and second branches 11, 12 defining the ends of the slot 10; and a trunk 13 between the two branches. The first, second, and third grooves (not shown) are provided in direct alignment with the first and second branches 11, 12 and they have substantially the same shape and the same dimensions as the first and second branches 11, 12. In this example, all of the slots 10 are substantially mutually identical, in shape and in size, and they are disposed substantially mutually parallel and pointing in identical directions both in the first and in the second compartments 6, 7. In the second midplane P2, the second branches 12 of the slots 10 of the first compartment 6 are superposed in alternation with the first branches 11 of the slots 10 of the second compartment 7.

In the example shown in FIG. 5, the slots in a first group of slots 20 are substantially Z-shaped, while the slots in a second group of slots 30 are substantially reverse-Z-shaped. Each of the Z-shapes and of the reverse-Z-shapes is made up of: first and second branches 21, 22; 31, 32 defining the ends of each slot 20, 30; and a trunk 23, 33 between the two branches. The slots 20 of the first compartment 6 are substantially mutually identical in shape and in size and they are disposed substantially parallel in rows spaced substantially uniformly apart. Similarly, the slots of the second compartment are substantially mutually identical in shape and in size and they are disposed substantially parallel in rows spaced substantially uniformly apart. The slots 20, 30 of the second compartment 7 point in the same directions as the slots 20, 30 of the first compartment 6. In any one compartment, namely in the first compartment 6 or in the second compartment 7, the slots 20, 30 point in opposite directions in alternation from one slot 20 to the other slot 30. In the second midplane P2, the second branches 22 of the slots 20 of the first compartment 6 are superposed in alternation with the first branches 21 of the slots 20 of the second compartment 7.

In the example shown in FIG. 6, each slot 40 is substantially T-shaped, made up of: first and second branches 41, 42 defining the ends of the slot; and a trunk 43 between the two branches. All of the slots 40 are substantially mutually identical in shape and in size, and they are disposed substantially mutually parallel. The slots 40 of the first compartment 6 are disposed in rows spaced apart substantially uniformly, with the slots pointing in identical directions. The slots 40 of the second compartment 7 are disposed in rows spaced apart substantially uniformly, with the slots pointing in identical directions. The slots 40 of the first compartment 6 point in a direction that is opposite relative to the direction of the slots in the second compartment 7. In the second midplane P2, the second branches 42 of the slots 40 of the first compartment 6 overlap the first branches 41 of the slots 40 of the second compartment 7.

In the example shown in FIG. 7, each slot 50 is substantially T-shaped, made up of: first and second branches 51, 52 defining the ends of the slot; and a trunk 53 between the two branches. All of the slots 50 are substantially mutually identical in shape and in size, and they are disposed substantially mutually parallel. The slots 50 of the first compartment 6 are disposed in rows spaced apart substantially uniformly. Similarly, the slots 50 of the second compartment 7 are disposed in rows spaced apart substantially uniformly. In any one compartment, namely in the first compartment 6 or in the second compartment 7, the slots 50 point in opposite directions in alternation from one slot 50 to the next. In addition, the slots 50 of the second compartment 7 point in directions that are opposite relative to the directions of the slots in the first compartment 6. In the second midplane P2, the second branches 52 of the slots 50 of the first compartment 6 overlap the first branches 51 of the slots 50 of the second compartment 7.

As shown in FIG. 1, the facing outer panels 4B may be provided with oblong orifices 8 serving as handles for taking hold of the storage tray 1.

In a configuration (not shown), the slots may have a configuration mirroring any one of the above-described configurations or any other suitable configuration.

Similarly, each compartment may have slots that are different in shape and/or in size. The storage tray may also be provided with a larger number of compartments. In a variant embodiment that is not shown, each slot is associated with a single groove.

In another variant embodiment (not shown), the storage tray does not include a partition. The slots then extend from one outer panel to the opposite other outer panel.

The grooves and/or additional grooves may be continuous or discontinuous. They may thus be formed by tabs distributed over the height of the outer panels and/or of the partition.

In another embodiment, the storage tray may be provided with a single slot associated with one or two grooves.

In yet another embodiment (not shown), not all of the slots are of the same shape and/or size, and may also be spaced apart non-uniformly and/or be disposed such that they are not mutually parallel.

With reference to FIGS. 2 and 3, the storage tray 1 is disposed in a tray-receiving zone provided with settling elements (not shown) suitable for co-operating with the additional grooves (not shown in these figures) to position the storage tray 1 accurately. Once the storage tray 1 is settled by the settling elements, the moving fingers 110 are in register with and beneath the slots 10, without being in contact with the flat articles 100. The teeth 120 of a comb disposed above the tray-receiving zone are in register with and above the first grooves 70. In order to unload the stack of flat articles 100 from the storage tray 1, in a first stage, the teeth 120 are inserted into the first grooves 70, by downward vertical movement in translation in a first direction T1. This movement in translation in the first direction T1 takes place without the flat article 100 that defines the flank of the stack and that is in contact with the bearing surface 72 of the first compartment 6 being in contact with the teeth 120 of the comb. In a second stage, the teeth 120 are moved in a horizontal second direction for tamping the flat articles and for shifting them away from the bearing surface wall 72 so as to prevent the flat articles 100 from rubbing against said bearing surface 72 and so as to facilitate unloading them. In a third stage, the moving fingers 110 and the teeth 120 are moved simultaneously in upward vertical translation in a third direction T3 parallel to and opposite from the first direction T1. During this movement in translation in the third direction T3, the moving fingers 110 pass through the slots 10, and engage into the first compartment 6 and into the first grooves 70 so that the edges of the flat articles 100 contained in the first compartment 6 rest on the free ends of the moving fingers 110. The moving fingers 110 extending in the first grooves 70 make it possible to prevent a flat article 100 from remaining wedged between the moving finger 110 and the bearing surface 72 of the first compartment 6. Thus, it is possible to be sure that the entire stack of flat articles 100 is moved at the same time. Once the stack of flat articles 100 has been moved above the outer panels 4A of the storage tray, the flat articles 100 can be moved laterally to complete the unloading. Loading is obtained by performing similar operations in the reverse order.

It appears clearly from the description that the storage tray 1 of the invention makes it possible, simply and reliably, to allow a stack of flat articles 100 on edge to be loaded and unloaded automatically by causing moving fingers 110 to move through slots 10; 20, 30; 40; 50 provided in the bottom plate 2 of the storage tray 1. During these movements, the edges of the flat articles 100 in the stack rest on the free ends of the moving fingers 110. The first, second, and third grooves 70, 80, 90 make it possible to receive the moving fingers 110 beyond the flat articles and thus to be sure that the entire stack is loaded or unloaded. In addition, the first, second, and third grooves 70, 80, 90 make it possible to receive the teeth of a comb making it possible to move the flank of the stack of flat articles 100 away from the bearing surface 72 so as to make loading and unloading easier and more reliable. The same storage tray 1 can thus be used equally well either for loading flat articles 100 into the first and second compartments or for unloading them therefrom. It is understood that the invention may extend to loading/unloading a plurality of compartments per storage tray simultaneously.

The invention claimed is:

1. A storage tray (1) for automatically loading and unloading stacks of flat articles (100) stacked on edge, said storage tray (1) having a bottom plate (2) and panels (4A, 4B, 5) parallel in pairs defining at least one compartment (6, 7) provided with an opening (9) that is provided opposite from said bottom plate (2), said compartment (6, 7) being designed to receive at least one stack of flat articles (100), provision being made for the edges of said flat articles to rest on said bottom plate (2) and for at least one flank of said stack to bear against a bearing surface (72, 82, 92) formed by the inside face of one of said panels (4A, 5), said storage tray being characterized in that said at least two of the said bearing surfaces (72, 82, 92) facing are each of them provided with at least one groove (70, 80, 90) having their end walls set back, said grooves (70, 80, 90) being disposed facing each other in pairs, and the grooves extending longitudinally from said bottom plate (2) up to said opening (9) and each of the grooves 970, 80, 90) being suitable for longitudinally receiving a tooth of a comb that is inserted into it without coming into contact with said flat articles (100), and that, once inserted, is designed to move said flank of said stack laterally away from said corresponding bearing surface (72, 82, 92), in that said bottom plate (2) is provided with at least one through slot (10; 20, 30; 40; 50), each of the ends of which is disposed in direct alignment with respectively one of said grooves (70, 80, 90), said slot (40; 50) being substantially of a shape chosen from T-shaped, and Z-shaped, the first and second branch (11, 12; 21, 22; 31, 32; 41, 42; 51, 52) of each slot defined the ends of said slot (40, 50) and a trunk (43, 53, 13, 23, 33) between the two branches and having a profile that is substantially identical to the profile of the respective corresponding groove (70, 80, 90), said slot (10; 20, 30; 40; 50) and each of said grooves (70, 80, 90) being suitable for allowing at least one moving finger (110) to pass through that is mounted to slide between a retracted position in which the free end of said moving finger (110) does not pass through said slot (10; 20, 30; 40; 50) and an active position in which said moving finger (110) passes through said slot (10; 20, 30; 40; 50) and is engaged in one of said grooves (70, 80, 90) so that the edges of all of said flat articles (100) of said stack rest on said free end and can be moved away from or towards said bottom plate (2) for the purpose of automatically unloading said flat articles (100) from said storage tray (1) or of automatically loading said articles (100) into said storage tray (1), without said flank of said stack coming into contact with said bearing surface (72, 82, 92).

2. A storage stray (1) according to claim 1, characterized in that said panels comprise at least two outer panels (4A) that are substantially mutually parallel, in that said "at least one groove" comprises first grooves (70) provided in the inside faces of said outer panels (4A), in that the outside face of each of said outer panels (4A) is provided with at least one additional groove (71) extending substantially parallel to said corresponding first groove (70) relative to which it is offset transversely, said additional groove (71) being suitable for longitudinally receiving at least one settling element designed to position said slot (10; 20, 30; 40; 50) relative to said moving finger (110).

3. A storage tray (1) according to claim 1, characterized in that it is provided with a plurality of first grooves (70) and of additional grooves (71) disposed in alternation with one another.

4. A storage tray (1) according to claim 1, characterized in that, in the first midplane (P1) of each outer panel (4A), said first grooves (70) and said additional grooves (71) are in part superposed relative to one another so that said first midplane (P1) simultaneously intersects said first grooves (70) and said additional grooves (71).

5. A storage tray (1) according to claim 1, characterized in that said "at least one compartment" comprises at least a first compartment (6) and a second compartment (7) that are mutually adjacent and that are defined by at least one panel defining a partition (5) subdividing said storage tray (1), in that said "at least one groove" further comprises at least one second groove (80) and at least one third groove (90) that are provided in the opposite inside walls of said partition (5), and in that said "at least one slot" comprises first slots (10; 20, 30; 40; 50) provided in said first compartment (6) and second slots (10; 20, 30; 40; 50) provided in said second compartment (7).

6. A storage tray (1) according to claim 1, characterized in that it is provided with a plurality of second grooves (80) and of third grooves (90) disposed in alternation with one another.

7. A storage tray (1) according to claim 1, characterized in that, in the second midplane (P2) of said partition (5), said second grooves (80) and said third grooves (90) are in part superposed relative to one another so that said second midplane (P2) simultaneously intersects said second grooves (80) and said third grooves (90).

8. A storage tray (1) according to claim 5, characterized in that at least some of said first slots (10; 20, 30; 40; 50) are disposed in register with at least some of said second slots (10; 20, 30; 40; 50), said partition (5) being arranged so that said second branches of said first slots (10; 20, 30; 40; 50) are superposed on said first branches of said second slots (10; 20, 30; 40; 50).

9. A storage tray (1) according to claim 8, characterized in that said first and second slots (10; 20, 30; 40; 50) are disposed in at least one of the following configurations that can be combined:
the first and second slots (10; 20, 30) point in identical directions;
the first and second slots (40; 50) point in opposite directions respectively in said first compartment (6) and in said second compartment (7);
said first slots (20, 30; 50) point in mutually opposite directions in alternation in said first compartment (6), and said second slots (20, 30; 50) point in mutually opposite directions in alternation in said second compartment (7).

10. A method of unloading at least one stack of flat articles (100) on edge from a storage tray (1) having a bottom plate (2) that receives the edges of said flat articles (100) and having at least one inside bearing surface (72, 82, 92) that receives a flank of said stack, said bottom plate (2) being provided with at least one through slot (10; 20, 30; 40; 50) through which at least one moving finger (110) is caused to slide between a retracted position in which the free end of said moving finger (110) does not pass through said slot (10; 20, 30; 40; 50) and an active position in which said moving finger (110) passes through said slot (10; 20, 30; 40; 50) to the opening (9) of said storage tray (1) so that the edges of said flat articles (100) of said stack rest on said free end and can be moved away from said bottom plate (2) for the purpose of unloading said stack from said storage tray (1), said method being characterized in that at least one storage tray (1) is used that is provided with at least one groove (70) provided in said bearing surface (72, 82, 92) and extending longitudinally from said bottom plate (2) to said opening (9), in that, before said moving finger (110) is caused to slide, and in a first stage, at least one tooth (120) is inserted into said groove (70) so that said tooth (120) is not in contact with the flank of said stack contained in said storage tray (1) and so that, in a second stage, said tooth (120) is shifted so as to move said flank away from said bearing surface (72), and in that, while said moving finger (110) is sliding from its retracted position to its active position, said tooth (120) is moved simultaneously.

11. A method of loading at least one stack of flat articles (100) on edge into a storage tray (1) having a bottom plate (2) designed to receive the edges of said flat articles (100) so that they bear against it, and having at least one inside bearing surface (72, 82, 92) designed to receive a flank of said stack, said bottom plate (2) being provided with at least one through slot (10; 20, 30; 40; 50) through which at least one moving finger (110) is caused to slide between an active position in which said moving finger (110) passes through said slot (10; 20, 30; 40; 50) to the opening (9) of said storage tray (1) so that the edges of said flat articles (100) of said stack can be placed on the free end of the moving finger (110) and a retracted position in which the free end of said moving finger (110) no longer passes through said slot (10; 20, 30; 40; 50) so that the edges of said flat articles (100) loaded in said storage tray (1) rest on said bottom plate (2), said method being characterized in that at least one storage tray (1) is used that is provided with at least one groove (70) provided in said bearing surface (72, 82, 92) and extending longitudinally from said bottom plate (2) to said opening (9), in that, before said moving finger (110) is caused to slide, said flank is shifted away from said bearing surface (72) by means of at least one tooth (120), in that, while said moving finger is sliding, said tooth (120) is inserted into said groove (70) so that said flank of said stack is not in contact with said bearing surface (72), and in that, while said moving finger (110) is sliding from its active position to retracted position, said tooth (120) is moved simultaneously.

* * * * *